(12) United States Patent
Lu

(10) Patent No.: US 8,805,655 B2
(45) Date of Patent: Aug. 12, 2014

(54) NUMERICAL METHOD FOR SIMULATING SUBSONIC FLOWS BASED ON EULER EQUATIONS IN LAGRANGIAN FORMULATION

(76) Inventor: Ming Lu, Tianjin (CN)

(*) Notice: Subject to any disclaimer, the term of this patent is extended or adjusted under 35 U.S.C. 154(b) by 198 days.

(21) Appl. No.: 13/188,484

(22) Filed: Jul. 22, 2011

(65) Prior Publication Data

US 2012/0065950 A1  Mar. 15, 2012

Related U.S. Application Data

(63) Continuation of application No. PCT/CN2010/076768, filed on Sep. 9, 2010.

(51) Int. Cl.
*G06F 7/60* (2006.01)
*G06F 17/10* (2006.01)

(52) U.S. Cl.
USPC .................................................. 703/2

(58) Field of Classification Search
USPC .................................................. 703/2
See application file for complete search history.

(56) References Cited

U.S. PATENT DOCUMENTS 7,359,841 B1 * 4/2008 Hixon .............................. 703/2

* cited by examiner

*Primary Examiner* — Saif Alhija (57) ABSTRACT

Numerical methods for simulating subsonic flows and solving inverse problems based on the new two-dimensional Euler equations in Lagrangian formulation. A transformation to derive the Euler equations in Lagrangian plane to simplify the computational grid and to minimize the numerical diffusion caused by the convective flux. Constructed is a numerical scheme, the dimensional-splitting with hybrid upwind flux operators, where the two-dimensional Riemann problem was solved in the Lagrangian plane. The method, solving the inverse geometry shape design problem in Lagrangian plane, gives the flow filed results and the geometry shape concurrently.

7 Claims, 4 Drawing Sheets

NUMERICAL METHOD FOR SIMULATING SUBSONIC FLOWS BASED ON EULER EQUATIONS IN LAGRANGIAN FORMULATION

CROSS-REFERENCE TO RELATED APPLICATIONS

This application is a continuation of International Patent Application No. PCT/CN2010/076768, with an international filing date of Sep. 9, 2010, designating the United States, now pending. The contents of all of the aforementioned applications, including any intervening amendments thereto, are incorporated herein by reference.

BACKGROUND OF THE INVENTION

1. Field of the Invention

This invention relates to the numerical methods for simulating invicid subsonic flows and solving a class of inverse problems, which is the shape design of aerodynamic body in invicid subsonic flows.

2. Description of the Related Art

Most of the existing CFD (Computational Fluid Dynamics) works utilize the Eulerian formulation to solve the fluid flow governing equations, which means in the Eulerian plane constituted by the Cartesian coordinates the computational grid is generated in advance and mainly based on the geometry constraints. The grid forms the computational cells. Across the cell interfaces, the convective flux exists since the fluid particles pass over. It is this convective flux that causes severe numerical diffusion in the numerical solutions because the numerical diffusion is directly associated with the error resulting from numerically approximating the convective term. Since the last century, the primary CFD efforts of algorithm researchers had been concentrated on developing more robust, accurate, and efficient ways to reduce the diffusion. In particular, the upwind methods had a great deal of success in solving fluid flows, because the upwind methods reasonably represent the characteristics of the convective flux. Typically, the Godunov method[1], solving the Riemann problem on the cell interfaces, gives the most accurate results. The FVS (Flux Vector Splitting) method[2], applying the eigenstructure of the equations to treat the flux term on the cell interfaces, is more efficient. However, the convective diffusion, as a result of the fundamental nature of the Eulerian formulation, still exists in those characteristic-based numerical schemes.

On the other hand, Lagrangian description to fluid flow states the motions and properties of the given fluid particles as they travel to different locations. For the governing equations of the fluid flow, such as the Euler equations in Lagrangian formulation, there must be one coordinate representing the streamlines, which can be the stream function numerically. Another coordinate could be the distance of the particles travel. This coordinate system constitutes the Lagrangian plane, where the computational grid points are literally fluid particles and the computational grid is always simply rectangular. In particular, since the particle paths coincide with the streamlines in steady flow and no fluid particles will cross the streamlines, there is no convective flux across the cell interfaces and the numerical diffusion can be thus minimized when the equations are solved in the Lagrangian plane.

One advantage from applying the Lagrangian formulation is when solving a class of inverse problems. The typical inverse problem of aerodynamics is posed by specifying the pressure distribution on the solid-wall of aerodynamic body and determining the geometry of this solid-wall that realizes this pressure distribution. If we solve the problems in the Eulerian plane, using such as the adjoint method[3], we have to firstly estimate the unspecified body shape, then to generate a grid around this shape, and to apply the numerical methods to the flows and find the pressure distribution on the body. Next, a very important and time-consuming step is to solve the adjoint equation to modify the geometry shape. As this process has to be repeated for several successive steps for shape modification until the final target geometry is reached, the computation time of this process is usually long. A Lagrangian formulation, as mentioned before, using the stream function as one coordinate, is more suitable to work on the unspecified geometry problem, since the unspecified shape (solid-wall boundaries) are always represented by streamlines, there no need to modify the computational grid like that in the adjoint method. In the Lagrangian plane, the computational grid will keep on the same in anytime, no matter the geometry of the body shape how to change, because any solid-wall surface in Lagrangian plane is a straight line with the constant values of stream function. The method for solving the geometry shape design problem in Lagrangian plane comes to the optimal process (the most efficient process).

Although the Lagrangian formulation presents such excellent properties, it was limited in supersonic flows simulation before[4]. When the Euler equations are numerically solved in Lagrangian plane, they spatially evolve downstream, there is no any upstream information need to consider, which therefore perfectly follows the physical characteristics in supersonic flows. Recently the Lagrangian formulation had been applied on the aerodynamic shape design problems in two-dimensional supersonic flow field[5]. Until recently, for the subsonic or low speed flow domain, using the advantage of the stream function as one coordinate working on the inverse shape design problems is only for potential flows (invicid, irrotational, incompressible) and linearized compressible flows[6].

There is an apparent need to apply the advantages of the Lagrangian formulation, such as the minimum numerical diffusion in simulation and the optimal process in shape design. Some industrial applications, such as two-dimensional invicid subsonic flow simulations and design cases for nozzle and airfoil, are common, useful and necessary in the preliminary phase of product design. Numerically solving subsonic flows by using the strict Lagrangian concept becomes an excessive obstacle, physically because there exist the upstream-propagating waves in subsonic flows. Thus, the existence of a body located downstream is transmitted to the oncoming fluid particles via the waves so that the particles, sensing the influences of upstream-propagating, can change motion accordingly. A key to the success of a numerical Lagrangian method for subsonic flows lies in how to properly and instantaneously feed these upstream-propagating waves to the particles. Several objects of this invention are: (a) to provide a Lagrangian formulation of the two-dimensional Euler equations with the zeroed-out convective flux along one coordinate to minimize numerical diffusion; (b) to provide the numerical methods that solve the Euler equations in Lagrangian formulation to find more accurate solutions; and (c) to provide the numerical method that is optimal to solve the inverse shape design problems in subsonic flows.

SUMMARY OF THE INVENTION

This invention supplies a new technology to simulate the invicid subsonic flows. It comprises a transformation to transfer the two-dimensional Euler equations into the ones in Lagrangian formulation in Lagrangian plane, which will not only accept a simple rectangular grid, but also produce the minimum convective diffusion when the characteristic-based numerical methods are use to solve the equations. A two dimensional Riemann solver is created to solve the Riemann problem across streamlines in Lagrangian plane. An advantage of using this new technology lies on solving a class of inverse problem of aerodynamic shape design. Solving the inverse Riemann problem on the solid-wall boundary greatly reduces the complicity of this kind problem, and the computing time reduces as much as the order of one. It gives the flow field solution and the geometry shape concurrently. So solving this class of inverse problem comes to the most efficient.

A method for simulating the two-dimensional invicid subsonic flows, comprising the following steps: (i) transforming the two-dimensional unsteady Euler equations in Euler plane to the Euler equations in Lagrangian formulation in Lagrangian plane; (ii) reading object geometry for providing points on a surface of an object; (iii) establishing a computational mesh around the object; and (iv) solving the Euler equations in Lagrangian formulation in Lagrangian plane using the Strang-dimensional-splitting scheme with hybrid upwind flux operators.

Euler equations in Lagrangian formulation include two set of equations, the Lagrangian physical conservation equations and the geometric conservation equations.

The Lagrangian plane has one time coordinate direction, which is stated by the Lagrangian time $\tau$, and two space coordinates directions, which is stated by the stream function $\xi$ and the Lagrangian-distance $\lambda$.

The transforming the two-dimensional unsteady Euler equations comprises a transformation matrix, which is be written as $$J = \begin{bmatrix} 1 & 0 & 0 \\ hu & \cos\theta & U \\ hv & \sin\theta & V \end{bmatrix}$$

where h is called Lagrangian behavior parameter, $\theta$ is the flow direction angle, u, v are the Cartesian components of flow velocity V, and U, V are the Lagrangian geometry state variables.

The Lagrangian physical conservation equations read as $$\frac{\partial f_L}{\partial \tau} + \frac{\partial F_L}{\partial \lambda} + \frac{\partial G_L}{\partial \xi} = 0,$$

where $f_L$ is the conservation variables vector and $F_L$, $G_L$ are the convective fluxes respectively in the $\lambda$, and $\xi$ direction in Lagrangian plane, $$f_L = \begin{bmatrix} \rho J \\ \rho J u \\ \rho J v \\ \rho J E \end{bmatrix}, \quad F_L = \begin{bmatrix} (1-h)\rho K \\ (1-h)\rho K u + V p \\ (1-h)\rho K v - U p \\ (1-h)\rho K H \end{bmatrix},$$

$$G_L = \begin{bmatrix} 0 \\ -p\sin\theta \\ p\cos\theta \\ 0 \end{bmatrix}, \quad \theta = tg^{-1}\left(\frac{v}{u}\right), \quad K = uV - vU, \quad 0 < h \le 1.$$

where the variables t, $\rho$, p, E and H are respectively the time, fluid density, pressure, total energy and enthalpy.

The geometric conservation equations read as $$\frac{\partial f_g}{\partial \tau} + \frac{\partial F_g}{\partial \lambda} + \frac{\partial G_g}{\partial \xi} = 0,$$

where $$f_g = \begin{bmatrix} U \\ V \end{bmatrix}, \quad F_g = \begin{bmatrix} 0 \\ 0 \end{bmatrix}, \quad G_g = \begin{bmatrix} -hu \\ -hv \end{bmatrix}.$$

The computing mesh is the two-dimensional rectangular mesh with $\lambda$ and $\xi$ as the two coordinate directions in the Lagrangian plane.

Solving the Euler equations in Lagrangian formulation in Lagrangian plane utilizes the time-like iteration along the direction of the Lagrangian time $\tau$ to find the steady solutions of the equations.

The Strang-dimensional-splitting scheme with hybrid upwind flux operators comprises the following steps in one step of updating of the conservative variables when the Lagrangian time $\tau$ in Lagrangian plane evolves, (A) calculating the convective fluxes across the cell interfaces in $\lambda$-direction by the FVS method with the time-step $\Delta\tau$; (B) solving the Riemann problem across streamlines in $\xi$-direction with the half time-step $\Delta\tau$ by the Godunov method with the local Riemann solver sequentially; and (C) calculating the convective fluxes across the cell interfaces in $\lambda$-direction by the FVS method with the time-step $\Delta\tau$ again.

The Riemann problem across streamlines in $\xi$-direction comprises that at the left or right state (region) of the cell interface, could be shock and expansion waves respectively, between which it is the star state (region), which can be divided into left and right star states (region) again.

Solving the Riemann problem across streamlines comprise the following steps: 1) Connecting the left and right states to the star state by integrating along the characteristic equations of the Lagrangian physical conservation equations; 2) Recovering the velocity magnitude in the star state; 3) Solving the combination function to find the flow angle in the star state; and 4) Finding the velocity component in the star state.

The step of recovering the velocity magnitude in the star region can be done according to the Rankine-Hugoniot relations across shocks and the Enthalpy constants across expansion waves.

The combination function f(u, v) reads as $$f(u, v) = \frac{1}{2}\frac{v\sqrt{u^2 + v^2}}{u} + \frac{1}{2}u\ln\left(v + \sqrt{u^2 + v^2}\right).$$

A method for solving the inverse shape design problem, comprising the following steps: a) initializing the flow field parameters and solid-wall angle; b) inputting the specified pressure distribution on the solid-wall; c) solving the inversed Riemann problem to find the mirror state of the solid-wall boundary; d) calculating the solid-wall angle; e) checking the convergence of the solid-wall angle; f) updating the flow field parameters; and g) repeating (c).

Solving the inversed Riemann problem comprises solving the combination function based on the specified pressure on the solid-wall, which can be written as $$f(V_R, \theta_L) = f(V_R, \theta_R) + \frac{2(P_w - P_R)}{\rho_R a_R},$$

where $P_R$, $\rho_R$, $a_R$, $V_R$, $\theta_R$, are the known flow field parameters in the solid-wall boundary, f is the combination function, $p_w$ is the specified pressure, and $\theta_L$ is the flow angle in ghost cells.

Solving the inversed Riemann problem comprises solving the combination function based on the specified pressure on the solid-wall by the Newton-Raphson iteration method to find the flow angle $\theta_L$.

BRIEF DESCRIPTION OF THE DRAWINGS

A detailed description of accompanying drawings will be provided below.

REFERENCE CHARACTERS

1. $[Q]_{i,j}^n$,

2. $[Q]_{i\pm 1/2,j}^n$,

3. $[F]_{i\pm 1/2,j}^n$,

4. $f_{i,j}^{n+1/3} = f_{i,j}^n - \Delta\tau\left[\frac{(F_{i+1/2,j}^n - F_{i-1/2,j}^n)}{\Delta\lambda}\right]$, 5. $(Q)_{i,j}^{n+1/3}$, 6. $[Q]_{i,j\pm 1/2}^{n+1/3}$, 7. $[G]_{i\pm 1/2,j}^{n+1/3}$, 8. $f_{i,j}^{n+2/3} = f_{i,j}^{n+1/3} - \Delta\tau\left[\frac{(G_{i,j+1/2}^{n+1/3} - G_{i,j-1/2}^{n+1/3})}{\Delta\xi}\right]$, 9. $[Q]_{i,j}^{n+2/3}$, 10. $[Q]_{i\pm 1/2,j}^{n+2/3}$, 11. $[F]_{i\pm 1/2,j}^n$, 12. $f_{i,j}^{n+1} = f_{i,j}^{n+2/3} - \Delta\tau\left[\frac{(F_{i+1/2,j}^{n+2/3} - F_{i-1/2,j}^{n+2/3})}{\Delta\lambda}\right]$, 13. $[Q]_{i,j}^{n+1}$.

DETAILED DESCRIPTION OF THE EMBODIMENTS

The Two-Dimensional Euler Equations in Lagrangian Formulation

This invention firstly provides a coordinate transformation from the Eulerian variables (t, x, y) in the Eulerian plane to the Lagrangian variables (τ, λ, ξ) in the Lagrangian plane, where the variable τ with the same dimension as time term t in the Euler plane, is introduced to function as the 'time-like' marching term for subsonic flows; the other two independent variables are the stream function ξ with dimension [m²·s⁻¹] and the Lagrangian-distance λ with dimension [m]. The coordinate ξ shall coincide with the streamlines of the fluid particles and λ is specified as the location of different particles along streamlines. This invention stars from the Euler equations in differential conservation form for two-dimensional unsteady inviscid compressible flows in the Eulerian plane $$\frac{\partial f}{\partial t} + \frac{\partial F}{\partial x} + \frac{\partial G}{\partial y} = 0, \quad (1)$$

Where f is the conservation variables vector and F, G are the convective fluxes in the two Cartesian directions. In detail, $$f = \begin{bmatrix} \rho \\ \rho u \\ \rho v \\ \rho E \end{bmatrix}, \quad F = \begin{bmatrix} \rho u \\ \rho u^2 + p \\ \rho uv \\ (\rho E + p)u \end{bmatrix}, \quad G = \begin{bmatrix} \rho v \\ \rho uv \\ \rho v^2 + p \\ (\rho E + p)v \end{bmatrix}. \quad (2)$$

The variables t, u, v, ρ and p are respectively the time, Cartesian components of flow velocity V, fluid density and pressure. The total energy E and enthalpy H are $$E = \frac{1}{2}(u^2 + v^2) + \frac{1}{r-1}\frac{p}{\rho} \quad \text{and} \quad (3)$$

$$H = E + \frac{p}{\rho} = \frac{u^2 + v^2}{2} + \frac{r}{r-1}\frac{p}{\rho}.$$

In above equation, $\gamma$ is the specific heat ratio. The Jacobian matrix of the transformation from coordinates (t, x, y) to ($\tau$, $\lambda$, $\xi$) can be written as $$J = \frac{\partial(t, x, y)}{\partial(\tau, \lambda, \xi)} = \begin{bmatrix} 1 & 0 & 0 \\ hu & \cos\theta & U \\ hv & \sin\theta & V \end{bmatrix}, \quad (4)$$

and its determinant J becomes $$J = \begin{vmatrix} \cos\theta & U \\ \sin\theta & V \end{vmatrix} = V\cos\theta - U\sin\theta, \quad (5)$$

where h is called Lagrangian behavior parameter, $\theta$ is the flow direction angle and the two quantities called the Lagrangian geometry state variables U, V with the dimension [$m^2 \cdot s \cdot kg^{-1}$] are defined as $$U = \frac{\partial x}{\partial \xi}, \quad V = \frac{\partial y}{\partial \xi}. \quad (6)$$

Finally, the two-dimensional time-dependent Euler equations (1) have been transformed into the ones in Lagrangian formulation in the Lagrangian plane, which include two set of partial differential equations in the conservation form, $$\frac{\partial f_L}{\partial \tau} + \frac{\partial F_L}{\partial \lambda} + \frac{\partial G_L}{\partial \xi} = 0, \quad (7)$$

$$\frac{\partial f_g}{\partial \tau} + \frac{\partial F_g}{\partial \lambda} + \frac{\partial G_g}{\partial \xi} = 0, \quad (8)$$

where $f_L$, $F_L$ and $G_L$ have the same definition as f, F, G in (2) but in Lagrangian plane, $$f_L = \begin{bmatrix} \rho J \\ \rho J u \\ \rho J v \\ \rho J E \end{bmatrix}, \quad F_L = \begin{bmatrix} (1-h)\rho K \\ (1-h)\rho Ku + Vp \\ (1-h)\rho Kv - Up \\ (1-h)\rho KH \end{bmatrix}, \quad G_L = \begin{bmatrix} 0 \\ -p\sin\theta \\ p\cos\theta \\ 0 \end{bmatrix}, \quad (9)$$

$$f_g = \begin{bmatrix} U \\ V \end{bmatrix}, \quad F_g = \begin{bmatrix} 0 \\ 0 \end{bmatrix}, \quad G_g = \begin{bmatrix} -hu \\ -hv \end{bmatrix}, \quad (10)$$

with the notations of J in (5), and $$\theta = tg^{-1}\left(\frac{v}{u}\right), \quad (11)$$

$$K = uV - vU, \quad (12)$$

$$0 < h \leq 1. \quad (13)$$

The equations (7) are called the Lagrangian physical conservation equations and (8) are the geometric conservation equations. In (9), we find that the first and last element in vector $G_L$ are zero, which means that for the computing grid in Lagrangian plane there apparently are no flux across the cell interfaces along $\xi$-direction for the continuity and energy equations, so that the numerical diffusion is minimized. There are some other properties of the Euler equations in Lagrangian formulation.

1. The equations (7) satisfy the homogeneity property, which implies that the FVS method can be used to resolve the flux term.
2. The equations (7) are not with the rotational invariance property, which implies that it is better to use the different numerical schemes for the convective flux along the two coordinate directions to keep the characteristic non-smeared.
3. The partial differential equation systems (7) and (8) are both strongly-hyperbolic, which implies that it is the well-posed initial problem and they can be solved using the time-like marching scheme.

Eigenstructure and Characteristics of the Euler Equations in Lagrangian Formulation For the physical conservation equations (7), the eigenstructure (eigen values and eigen vectors) can be found, according to the definition of the Jacobian matrix, $$B_L = \frac{\partial F_L}{\partial Q}, \quad C_L = \frac{\partial G_L}{\partial Q}, \quad (14)$$

where $Q = [\rho, u, v, p]^T$. Ones can find the four eigenvalues of the Jacobian matrix $B_L$, $$\mu_{L1,2} = (1-h)\sqrt{u^2+v^2} \mu_{L3,4} = (1-h)\sqrt{u^2+v^2} \pm (a/j)\sqrt{U^2+V^2} \quad (15)$$

and the four corresponding right eigenvectors $$K_L^{(1)} = \begin{bmatrix} 1 \\ 0 \\ 0 \\ 0 \end{bmatrix}, \quad K_L^{(2)} = \begin{bmatrix} 0 \\ U/\rho \\ V/\rho \\ 0 \end{bmatrix}, \quad (16)$$

$$K_L^{(3)} = \begin{bmatrix} 1 \\ \frac{V}{\sqrt{U^2+V^2}}\left(\frac{a}{\rho}\right) \\ \frac{-U}{\sqrt{U^2+V^2}}\left(\frac{a}{\rho}\right) \\ a^2 \end{bmatrix}, \quad K_L^{(4)} = \begin{bmatrix} 1 \\ \frac{-V}{\sqrt{U^2+V^2}}\left(\frac{a}{\rho}\right) \\ \frac{U}{\sqrt{U^2+V^2}}\left(\frac{a}{\rho}\right) \\ a^2 \end{bmatrix},$$

along $\lambda$-direction; and the four eigenvalues of the Jacobian matrix $C_L$, $$\mu_{L1,2} = 0, \mu_{L3,4} = \pm(a/j), \quad (17)$$

and the four corresponding right eigenvectors $$K_L^{(1)} = \begin{bmatrix} 1 \\ 0 \\ 0 \\ 0 \end{bmatrix}, \quad K_L^{(2)} = \begin{bmatrix} 0 \\ \cos\theta/\rho \\ \sin\theta/\rho \\ 0 \end{bmatrix}, \quad (18)$$

$$K_L^{(3)} = \begin{bmatrix} 1 \\ -\sin\theta\left(\frac{a}{\rho}\right) \\ \cos\theta\left(\frac{a}{\rho}\right) \\ a^2 \end{bmatrix}, \quad K_L^{(4)} = \begin{bmatrix} 1 \\ \sin\theta\left(\frac{a}{\rho}\right) \\ -\cos\theta\left(\frac{a}{\rho}\right) \\ a^2 \end{bmatrix},$$

in $\xi$-direction, where a is the speed of sound. The characteristic equations of the Lagrangian physical conservation equations (7) can be written as $$dp \pm \rho a \frac{\sqrt{U^2 + V^2}}{V} du = 0 \qquad (19)$$

along $$\frac{d\lambda}{d\tau} = \mu_{L_{3,4}} = (1-h)\sqrt{u^2 + v^2} \pm \left(\frac{a}{J}\right)\sqrt{U^2 + V^2} \text{ ;}$$

$$dp \pm \rho a \frac{\sqrt{u^2 + v^2}}{u} dv = 0 \qquad (20)$$

along $d\xi/d\tau = \mu_{L_{3,4}} = \pm(a/j)$. Based on the Jacobian matrix of the transformation (4), the Riemann invariants in Lagrangian plane in $\lambda$-direction become $$u - \frac{V}{\sqrt{U^2 + V^2}} \frac{2a}{\gamma - 1} = \Re^+, \qquad (21)$$

$$u + \frac{V}{\sqrt{U^2 + V^2}} \frac{2a}{\gamma - 1} = \Re^-;$$

the Riemann invariants in $\xi$-direction are $$v - \cos\theta \frac{2a}{\gamma - 1} = \Re^+, \quad v + \cos\theta \frac{2a}{\gamma - 1} = \Re^-. \qquad (22)$$

The equations (15)-(22) will be used to construct the numerical scheme for solving the governing equations (7) and (8).

Construction of Numerical Scheme

To solve the two-dimensional Euler equations in Lagrangian formulation (7) and (8) in Lagrangian plane, the FVM (Finite Volume Method) is chosen as the spatial discretization. As stated before, the computational grid in Lagrangian plane is simple rectangular. A cell-center scheme will be applied, where the flow quantities are stored at the centers of the grid cells. Based on the properties of the homogeneity, rotation invariance and hyperbolicity of the equations (7) and (8), to keep the efficiency and accuracy of the calculations, this invention, combining the advantages of both the Godunov method and FVS method, supplies a new method of solution, the dimensional splitting scheme with hybrid upwind flux operators, which means that the convective fluxes across the cell interfaces will be calculated by the FVS method in $\lambda$-direction and the Godunov method with local Riemann solver in $\xi$-direction sequentially. The Strang dimensional-splitting, which is the second-order accuracy in time, is applied for the temporal discretization. Now, let's drop the subscript L with the Lagrangian sense for the convenience reason.

FVS Method in $\lambda$-Direction

Firstly rewrite equations (7) only along $\lambda$-direction, $$\frac{\partial f}{\partial \tau} + \frac{\partial F}{\partial \lambda} = 0. \qquad (23)$$

By applying the FVS (flux vector splitting) method, one obtains the solutions at all the cell (i,j) at the new time-step $$f_{i,j}^{n+1} = f_{i,j}^n - \frac{\Delta \tau}{\Delta \lambda}[L_i^+ f_{i,j}^n - L_{i-1}^+ f_{i-1,j}^n + L_{i+1}^- f_{i+1,j}^n - L_i^- f_{i,j}^n], \qquad (24)$$

where n is the number of time-step, i,j are the cell indices, $\Delta \tau$ the time-step, $\Delta \lambda$ is the spatial step. The split matrix $$L^+ = K_{Lcv} \Lambda^+ K_{Lcv}^{-1} \text{ and } L^- = K_{Lcv} \Lambda^- K_{Lcv}^{-1}, \qquad (25)$$

with the split matrix of eigenvalues $$\Lambda^+ = \begin{bmatrix} \mu_{L_1} & & & \\ & \mu_{L_2} & & \\ & & \mu_{L_3} & \\ & & & 0 \end{bmatrix} \text{ and } \Lambda^- = \begin{bmatrix} 0 & & & \\ & 0 & & \\ & & 0 & \\ & & & \mu_{L_4} \end{bmatrix}; \qquad (26)$$

and the matrix $$K_{Lcv} = \begin{bmatrix} 1 & 0 & 1 & 1 \\ u & U\frac{\rho}{J} & u + \frac{Va}{\sqrt{U^2+V^2}} & u - \frac{Va}{\sqrt{U^2+V^2}} \\ v & V\frac{\rho}{J} & v - \frac{Ua}{\sqrt{U^2+V^2}} & v + \frac{Ua}{\sqrt{U^2+V^2}} \\ \frac{u^2+v^2}{2} & (Uu+Vv)\frac{\rho}{J} & \frac{u^2+v^2}{2} + \frac{Ka}{\sqrt{U^2+V^2}} + \frac{a^2}{1-\gamma} & \frac{u^2+v^2}{2} - \frac{Ka}{\sqrt{U^2+V^2}} + \frac{a^2}{1-\gamma} \end{bmatrix} \qquad (27)$$

and the inverse of it reads $$K_{Lcv}^{-1} = \frac{(\gamma - 1)}{2a^2} \begin{bmatrix} u^2 + v^2 + \frac{2a^a}{\gamma - 1} & -2u & -2v & 2 \\ -\left(\frac{Uu+Vv}{U^2+V^2}\right)\frac{2a^2 J}{(\gamma-1)\rho} & \left(\frac{U}{U^2+V^2}\right)\frac{2a^2 J}{(\gamma-1)\rho} & \left(\frac{V}{U^2+V^2}\right)\frac{2a^2 J}{(\gamma-1)\rho} & 0 \\ -\frac{u^2+v^2}{2} - \frac{K}{\sqrt{U^2+V^2}}\left(\frac{a}{\gamma-1}\right) & u + \frac{V}{\sqrt{U^2+V^2}}\left(\frac{a}{\gamma-1}\right) & v - \frac{U}{\sqrt{U^2+V^2}}\left(\frac{a}{\gamma-1}\right) & -1 \\ -\frac{u^2+v^2}{2} + \frac{K}{\sqrt{U^2+V^2}}\left(\frac{a}{\gamma-1}\right) & u - \frac{V}{\sqrt{U^2+V^2}}\left(\frac{a}{\gamma-1}\right) & v + \frac{U}{\sqrt{U^2+V^2}}\left(\frac{a}{\gamma-1}\right) & -1 \end{bmatrix}. \qquad (28)$$

Godunov Method with Riemann Solver in ξ-Direction

For the Godunov method, the key ingredient is the solution of the Riemann problem.

Figure 1:
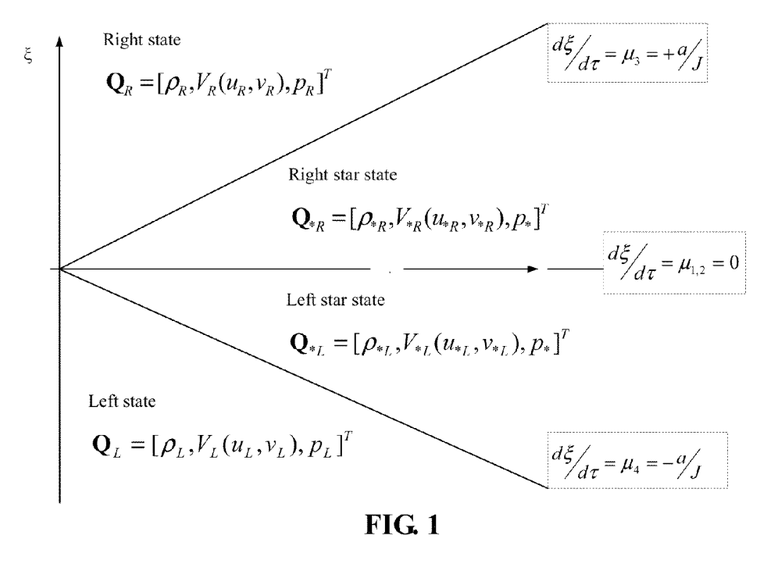
FIG. 1 illustrates the Riemann problem across streamline along ξ-direction in Lagrangian plane.

This invention solves the Riemann problem along ξ-direction, which is called the Riemann problem across streamlines. FIG. 1 shows the definition of the Riemann problem across streamlines. Rewrite (7) only in ξ-direction, $$\frac{\partial f}{\partial \tau} + \frac{\partial G(f)}{\partial \xi} = 0, \quad f = \begin{cases} f_L & \xi < 0 \\ f_R & \xi > 0. \end{cases} \quad (29)$$

Where $f_L$ and $f_R$ are the conservation variables at the left and right state of the cell interface respectively. From now, the subscripts L are for the left state, R for the right, and * for the star for the Riemann problem. At the left or right state, shock and expansion waves could be. Between them, it is the star state (region), which can be divided into left and right star states again like shown in FIG. 1. The solutions of the new time-step can be obtained from the discretized equations of (29), $$f_{i,j}^{n+\frac{1}{2}} = f_{i,j}^n - \frac{\Delta \tau}{\Delta \xi}\left[G\left(f_{i,j+\frac{1}{2}}^n\right) - G\left(f_{i,j+\frac{1}{2}}^n\right)\right]. \quad (30)$$

The task is to find the values of the primitive variables p, ρ, u, v from f to get G at cell interfaces j±½, where the primitive variables are the variables in the star region in the Riemann problem. A Riemann solver was built as the following procedure. Connecting the left and right states to the star state by integrating along the characteristics equations (19) and (20), then ones have $$\begin{cases} p_* + C_L \cdot f(u_*, v_*) = p_L + C_L \cdot f(u_L, v_L), & (31) \\ p_* - C_R \cdot f(u_*, v_*) = p_R - C_R \cdot f(u_R, v_R), & (32) \\ \rho_{*L} + f(u_*, v_*)\left(\frac{\rho_L}{a_L}\right) = \rho_L + f(u_L, v_L)\left(\frac{\rho_L}{a_L}\right), & (33) \\ \rho_{*R} - f(u_*, v_*)\left(\frac{\rho_R}{a_R}\right) = \rho_R - f(u_R, v_R)\left(\frac{\rho_R}{a_R}\right), & (34) \end{cases}$$

where
$C_L = \rho_L a_L$, $C_R = \rho_R a_R$,
and $$f(u, v) = \frac{1}{2}\frac{v\sqrt{u^2+v^2}}{u} + \frac{1}{2}u\ln\left(v + \sqrt{u^2+v^2}\right) \quad (35)$$

f(u, v) is called the combination function, which can be considered as the combination of the velocity component (u, v) in Lagrangian plane and have the same role as the velocity term with dimension [m/s]. The (35) has its polar form as $$f_\Delta(V, \theta) = \frac{V}{2}(tg\theta + \cos\theta\ln(1 + \sin\theta)) + \frac{\cos\theta}{2}V\ln V. \quad (36)$$

With $V = \sqrt{u^2+v^2}$, $u = V \cos \theta$ and $v = V \sin \theta$. The solutions of (31)-(34) present the primitive variables in the star state $$\begin{cases} p_* = \frac{C_R p_L + C_L p_R + C_L C_R [f(u_L, v_L) - f(u_R, v_R)]}{C_L + C_R}, & (37) \\ f(u_*, v_*) = \frac{C_L \cdot f(u_L, v_L) + C_R \cdot f(u_R, v_R) + [p_L - p_R]}{C_L + C_R}, & (38) \\ \rho_{*L} = \rho_L + (f(u_L, v_L) - f(u_*, v_*))(\rho_L/a_L), & (39) \\ \rho_{*R} = \rho_R + (f(u_*, v_*) - f(u_R, v_R))(\rho_R/a_R). & (40) \end{cases}$$

To find the velocity components ($u_*$, $v_*$) either in left or right star state, the equation (38) need to be solved. Firstly, one can rewrite (38) as $$F(u_*, v_*) = f(u_*, v_*) - B = 0, \quad (41)$$

with the known conditions in left and right states, $$B = \frac{C_L \cdot f(u_L, v_L) + C_R \cdot f(u_R, v_R) + [p_L - p_R]}{C_L + C_R}. \quad (42)$$

The combination function (35) can be further modified. One can define $$tg\theta_* = \epsilon, \quad (43)$$

Where $\theta_*$ is the flow angle either in left or right star state, then $$u_* = V_*\cos\theta_* = \frac{V_*}{\sqrt{1+\epsilon^2}}, \quad v_* = V_*\sin\theta_* = \frac{\epsilon V_*}{\sqrt{1+\epsilon^2}}, \quad (44)$$

where $V_*$ representing the velocity magnitude either in the left or right star state. Further, the equation (41) can be finalized as a function of $\epsilon$ $$F(\epsilon) = \frac{V_*}{2}\left(\epsilon + \frac{\ln V_* + \ln(\epsilon + \sqrt{1+\epsilon^2}) - \ln\sqrt{1+\epsilon^2}}{\sqrt{1+\epsilon^2}}\right) - B = 0. \quad (45)$$

The work needs to do is numerically to solve the equation $F(\epsilon)=0$ with a given velocity $V_*$ to find $\epsilon$ for $\theta_*$. The equation (45) does have the differentiability and its first-order derivative of F is $$F'(\epsilon) = \frac{V_*}{2}\left(\frac{(2+\epsilon^2)\sqrt{1+\epsilon^2} - \epsilon - \epsilon(\ln V_* + \ln(\epsilon + \sqrt{1+\epsilon^2}) - \ln\sqrt{1+\epsilon^2})}{\sqrt{(1+\epsilon^2)^3}}\right). \quad (46)$$

Numerical experiments show that for the non-dimensional velocity $V_* \leq 5$ (subsonic flows) and $\epsilon \in [-1, 1]$, $F'(\epsilon) > 0$, which means that the function $F(\epsilon)$ is monotone within this domain; in the mean time, $F(-\epsilon) \cdot F(\epsilon) < 0$, so that the Newton-Raphson iteration as a root-finding algorithm is a good way to find the root $\epsilon$ for the equation (45) with a given $V_*$. To find the value of $V_*$, the non-linear waves (shear, shock and expansion waves) in Riemann problem have to be recovered with the approximate values of $p^*$, $\rho_{*L}$, $\rho_{*R}$. In this invention, the following relations are considered.

Rankine-Hugoniot Relations Across Shocks

If a shock wave appears between one state (say left) and the corresponding star state, across this shock, the Rankine-Hugoniot relations can be used to the left state and star state. They are, $$\begin{cases} \mu_s(\rho_L J_L - \rho_{*L} J_{*L}) = 0, & (46) \\ \mu_s(\rho_L J_L u_L - \rho_{*L} J_{*L} u_{*L}) = p_* \sin\theta_* - p_L \sin\theta_L, & (47) \\ \mu_s(\rho_L J_L v_L - \rho_{*L} J_{*L} v_{*L}) = p_L \cos\theta_L - p_* \cos\theta_*, & (48) \\ \mu_s(\rho_L J_L E_L - \rho_{*L} J_{*L} E_{*L}) = 0, & (49) \end{cases}$$

where $\mu_s$ is the shock wave speed, $J_{*L}$ and $E_{*L}$, are J (transformation Jacobian) and E (total energy) in the star state respectively. From (46) and (49), one receives $$V_{*L} = \sqrt{V_L + \frac{1}{\gamma-1}\left(\frac{P_L}{\rho_L} - \frac{P_*}{\rho_{*L}}\right)} \qquad (50)$$

and $$V_{*R} = \sqrt{V_R + \frac{1}{\gamma-1}\left(\frac{P_R}{\rho_R} - \frac{P_*}{\rho_{*R}}\right)}. \qquad (51)$$

Velocity absolute value $V_{*L}$ or $V_{*R}$ can be substituted into (45) to receive $\theta_{*R}$ or $\theta_{*R}$.

Enthalpy Constants Across Expansion Waves

If an expansion wave appears between one state (say left) and the corresponding star state, the connection between the two states can be found by considering the enthalpy constant across the waves. Ones have $$H_L = \frac{1}{2}V_L + \frac{\gamma}{\gamma-1}\frac{P_L}{\rho_L} = \frac{1}{2}V_{*L} + \frac{\gamma}{\gamma-1}\frac{P_*}{\rho_{*L}} = H_{*L}, \qquad (52)$$

from which the velocity magnitude can be found as $$V_{*L} = \sqrt{2H_L - \frac{2\gamma}{\gamma-1}\frac{P_*}{\rho_{*L}}} \qquad (53)$$

and $$V_{*R} = \sqrt{2H_R - \frac{2\gamma}{\gamma-1}\frac{P_*}{\rho_{*R}}}. \qquad (54)$$

The selection of the non-linear waves is based on the wave-type conditions, in which the values of pressure in left, right and star states can be found to judge what non-linear wave could appearing in the Riemann problem. Assuming $$P_{min} = \min(P_L, P_R); \qquad (55)$$

$$P_{max} = \max(P_L, P_R), \qquad (56)$$

which, as well as $p_*$, form the following wave-type choosing conditions:
 (1) If $P_{min} < P_* < P_{max}$, which means in the Riemann problem one shock wave in the state with $p_{min}$ and one expansion wave in the state with max $P_{max}$.
 (2) If $P_* \geq P_{max}$, which means there are two shock waves in Riemann problem.
 (3) If $P_* \leq P_{min}$, which means there are two expansion waves the in Riemann problem.

After $\theta_*$ is obtained, we can find $G_L$ according to (9) and $u_{*L}, v_{*L}$ or $u_{*R}, v_{*R}$ from (44). Those values, as well as $p_*$, can be used to compute the flux term in Godunov method (30). At the same time, the geometry conservation equations (8) can be updated $$\begin{bmatrix} U_{i,j}^{n+1} \\ V_{i,j}^{n+1} \end{bmatrix} = \begin{bmatrix} U_{i,j}^{n} \\ V_{i,j}^{n} \end{bmatrix} + h\frac{\Delta\tau_{i,j}^{n}}{\Delta\xi_{i,j}}\begin{bmatrix} u_{i,j+1/2}^{n+1/2} - u_{i,j-1/2}^{n+1/2} \\ v_{i,j+1/2}^{n+1/2} - v_{i,j-1/2}^{n+1/2} \end{bmatrix}. \qquad (57)$$

Although this step is an additional to the method in the Eulerian formulation, it is a trivial step and will no cost more computing time.

Boundary Conditions

Two layers of cells should be put, which are called the ghost cells, surrounding the whole computational domain, to make it possible to extend any spatial discretization scheme beyond the boundaries.

Solid-Wall Boundary Condition

In the selected scheme, the Riemann problem at the solid-wall boundary in $\xi$-direction has to be solved, where the left or right state in Riemann problem consists of a mirror image with respect to the solid-wall. In the solid-wall boundary conditions, where subscript L means the quantities $\rho$, p, u, v, $\theta$ in the ghost cells; while subscript R means any ones in the boundary cells. $\theta_w$ is the angle of the solid-wall. Based on the solutions of the Riemann problem given in (37)-(40), on the solid-wall, $$P_* = P_R, \qquad (58)$$

$$\rho_{*L} = \rho_{*R} = \rho_R + \frac{1}{2}(f(V_R, \theta_L) - f(V_R, \theta_R))\left(\frac{\rho_R}{a_R}\right). \qquad (59)$$

The pressure in the star state can be considered as the pressure on the solid-wall $p_w$ $$P_w = P_*. \qquad (60)$$

If the pressure on the stationary wall ($p_w$) had been specified, the specified pressure can be directly used as the pressure in the star state (region) in the Riemann solver, $$P_* = P_w. \qquad (61)$$

In/Out Flow Boundary Condition

For the subsonic inlet boundary, the first relation corresponds to the positive, incoming, characteristics. Hence the values at the boundary, indicated by a subscribe b, are obtained from the Riemann invariance in (21)-(22). They are $$\Re_b^- = u_b + \frac{V_b}{\sqrt{V_b^2 + U_B^2}}\frac{2a_b}{\gamma-1} = u_\infty + \frac{V_\infty}{\sqrt{V_\infty^2 + U_\infty^2}}\frac{2a_\infty}{\gamma-1}, \qquad (62)$$

$$\Re_b^+ = u_b - \frac{V_b}{\sqrt{V_b^2 + U_B^2}}\frac{2a_b}{\gamma-1} = u_i - \frac{V_i}{\sqrt{V_i^2 + U_i^2}}\frac{2a_i}{\gamma-1}, \qquad (63)$$

where $u_\infty$, $a_\infty$ are the velocity and the speed of sound for the free stream; the subscript i refers to a value at an internal point. The second relation is associated with a numerical boundary condition and has to be estimated from inside the domain by an appropriate extrapolation. Hence, the velocity $u_b$ is obtained by adding equation (62) and (63), then $$u_b = \frac{\mathfrak{R}_b^+ + \mathfrak{R}_i^-}{2}. \tag{64}$$

A quite similar way can be used to treat the subsonic outflow boundaries, with the difference that the one specified variable at the boundary is $p_\infty$, (the pressure at infinite), $$\mathfrak{R}_b^- = \tag{65}$$

$$-|u_b| + \frac{V_b}{\sqrt{V_b^2 + U_B^2}} \frac{2a_b}{\gamma - 1} = \mathfrak{R}_\infty^- = -|u_\infty| + \frac{V_\infty}{\sqrt{V_\infty^2 + U_\infty^2}} \frac{p_\infty}{\rho_\infty a_\infty}.$$

Boundary Conditions for Lagrangian Geometry State Variables

Another boundary conditions need to implement are the Lagrangian geometry state variables U and V. For the solid-wall boundary, $$U_L = \sin(2\theta_w - \theta_R), \tag{66}$$

$$V_L = \cos(2\theta_w - \theta_R). \tag{67}$$

For in/outlet boundaries, we specify the flow angle $\theta=0$, then, $$U=0, \tag{68}$$

$$V=1. \tag{69}$$

Figure 2:
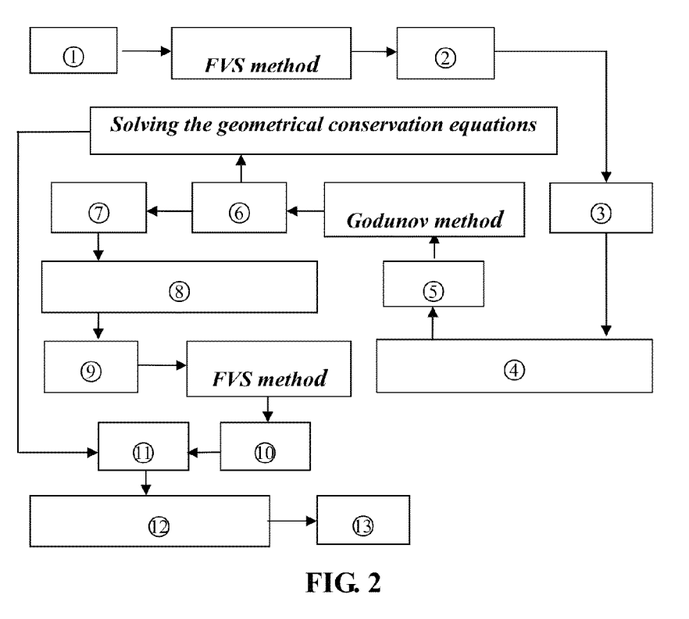
FIG. 2 illustrates flow chart of one time-step for updating the flow field using the second-order Scheme: dimensional-splitting with hybrid flux operators.

A flow chart presenting the numerical procedures for one step of updating from $[Q]_{i,j}^n$ to $[Q]_{i,j}^{n+1}$ with second-order accuracy in time and space, where $Q=[\rho, u, v, p]^T$ are the physical parameters of the flow field, is given in FIG. 2.

Method for Solving a Class of Inverse Problems

Since using the Lagrangian formulation, the solid-wall boundaries are always represented by streamlines, which will be the stream function in Lagrangian plane, where any streamlines represented by the computing grids are straight lines. Exploring the advantage of the Lagrangian formulation on a class of inverse problem is another purpose in this invention. From now, this class problem is defined as the inverse geometry shape design problem.

In Section 2, we introduced the solutions of the local Riemann problem in $\xi$-direction in Lagrangian plane and the solid-wall boundary condition. From (37) and (57), ones have $$P_w = P_R + \frac{\rho_R a_R}{2}(f(V_R, \theta_L) - f(V_R, \theta_R)), \tag{70}$$

where $p_R$, $\rho_R$, $a_R$, $V_R$, $\theta_R$ are the known state variables in boundary and f is the combination function in triangle form given in (35) and (36). From (70), ones have $$f(V_R, \theta_L) = f(V_R, \theta_R) + \frac{2(P_w - P_R)}{\rho_R a_R}, \tag{71}$$

which can be numerically solved with the specified $p_w$ to get the flow angle $\theta_L$ in ghost cells. Using the mirror boundary condition, the wall angle is $$\theta_w = \frac{1}{2}(\theta_L + \theta_R). \tag{72}$$

The inverse geometry shape design means finding the solid-wall angle based on the specified pressure distribution on the solid-wall. The recovering of the solid-wall angle needs to solve the inversed Riemann problem here. An inverse Riemann solver is built as the following procedure. One can define $$tg\theta_L = \epsilon, \tag{73}$$

Then we have the velocity components in ghost cells $$u_L = V_R \cos\theta_L = \frac{V_R}{\sqrt{1 + \epsilon^2}}, \tag{74}$$

$$v_L = V_R \sin\theta_L = \frac{\epsilon V_R}{\sqrt{1 + \epsilon^2}},$$

which can be substituted into the combination function in triangle form (71), which can be further modified and finalized as a function of $\epsilon$ $$F(\epsilon) = \frac{V_R}{2}\left(\epsilon + \frac{\ln V_R + \ln(\epsilon + \sqrt{1 + \epsilon^2}) - \ln\sqrt{1 + \epsilon^2}}{\sqrt{1 + \epsilon^2}}\right) - \tag{75}$$

$$f(V_R, \theta_R) - \frac{2(P_w - P_R)}{\rho_R a_R}.$$

The work needs to do is numerically to solve the equation $F(\epsilon)=0$ with a given physical parameters $\rho_R$, $p_R$, $V_R$, $\theta_R$ and $p_w$ to find $\epsilon$ for $\theta_L$. The equation (75) does have the differentiability and its first-order derivative of F in respect to $\epsilon$ is $$F'(\epsilon) = \frac{V_R}{2}\left(\frac{(2 + \epsilon^2)\sqrt{1 + \epsilon^2} - \epsilon - \epsilon(\ln V_R + \ln(\epsilon + \sqrt{1 + \epsilon^2}) - \ln\sqrt{1 + \epsilon^2})}{\sqrt{(1 + \epsilon^2)^3}}\right). \tag{76}$$

Similar to the method for (45), the updated value $\epsilon$ in new step can be expressed as $$\epsilon^{n+1} = \epsilon^n - \frac{F(\epsilon^n)}{F'(\epsilon^n)}. \tag{77}$$

The flow angle in ghost cells can be recovered by $\theta_L = tg^{-1}(\epsilon^{n+1})$. The solid-wall angle $\theta_w$ can be found by using equation (72).

Figure 3:
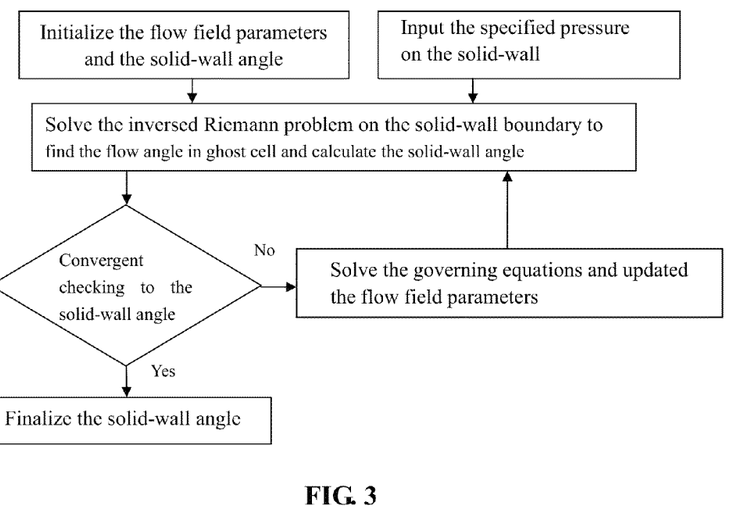
FIG. 3 illustrates flow chart of an inverse method for geometry shape design.

The flow chart for solving the inverse geometry design problem is given in FIG. 3.

This method starts from the guessed flow filed physical values and solid-wall angle, the inversed Riemann solver with the specified pressure distribution applied on the solid wall boundary will give the flow angles in ghost cells, then the wall angle can be obtained and substituted back to the flow solver for updating the physical variables. This procedure will continue until an iterated solid-wall angle within the convergence tolerance is reached. It is obvious that the convergent criteria is the solid-wall angle instead of any physical parameter, which means that the solid-wall angle become a flow field variable. The change of the boundary each iteration doesn't change the characteristics of the equations and the equations are still the strong-hyperbolic system; therefore, it is still a well-posed initial problem. Compared to the methods used in the Eulerian plane, such as the adjoint method, the method needs neither the step of the grid generation for the updated geometry shape, nor the step of solving the adjoint equation. It obtains the convergent physical solutions in flow field and the geometry shape concurrently, which will be the one-shot and optimal method in the inverse geometry shape design problem. The total CPU time for this class problem will reduce the order of one.

Invicid Subsonic Internal Flow Passing a Divergent Nozzle

According to the numerical methods discussed above, a complete solution to the invicid subsonic internal flow by using the Euler equations in Lagrangian formulation will be performed. This example is about the subsonic flow passing through a two-dimensional parabolic divergent nozzle with length L and inlet height $H_{in}$, whose geometry is defined as the two parts of parabolic curves $$H(x) = \begin{cases} -ax^2, & 0 \le x < \frac{L}{2}; \\ a(x-L)^2 - b, & \frac{L}{2} \le x \le L, \end{cases} \quad (78)$$

where $H_{in}=L/3$, $a=H_{in}/2$, $b=H_{in}/L$. The Mach number of the inviscid flow at the nozzle inlet is $M_{in}=0.5$. The flow is the pure subsonic flow. The Euler equations in Lagrangian formulation (7) and (8) will be solved by the numerical scheme presented in Section 2, where the Strang dimensional-splitting of second-order accuracy in time and hybrid flux operators with second-order upwind MUSCL extrapolation with minmod limiter are used. The computing parameters: CFL=0.48; the Lagrangian behavior parameter h=0.98; totally 60×20 uniform cells in Lagrangian plane. The computing results will be compared with those obtained from the JST method based on FVM in Eulerian plane and the exact solutions. Now, denoting the solution obtained in Lagrangian plane by the invented method as the Lagrangian solutions and the results obtained from the Eulerian plane by the Eulerian formulation as the Eulerian solutions. In detail, the computations are taken as the following steps with referring to FIG. 2.

(1) Initialization. The flow field variables $Q^0=[\rho^0, u^0, v^0, p^0]^T$ are known as the initial conditions as well as $U^0, V^0$, where $Q^0$ take the values at the infinite and $U^0=0$; $V^0=1$. The superscript 0 means that the initial conditions of a flow problem are given at t=0 ($\tau=0$) in x-y plane and $\lambda$-$\xi$ plane. Subsequently, the conservation variables $f^0$ are available. Then an appropriate rectangular $\lambda$-$\xi$ coordinate mesh with uniform spatial-step ($\Delta\lambda$, $\Delta\xi$) is formed. The corresponding mesh in x-y plane is laid on according to $$dx=\cos\theta d\lambda \text{ and } dy=\sin\theta d\lambda. \quad (79)$$

(2) Calculating the time-step. Based on the variables at time-step n, (n=0, 1, 2, . . . ), and CFL<0.5, calculate the time-step, $$\Delta\tau = CFL \cdot \max\left(\frac{\Delta\lambda}{\left|\left(\frac{a}{J}\right)\sqrt{U^2+V^2}+(1-h)\sqrt{u^2+v^2}\right|}, \frac{\Delta\xi}{\left|\frac{a}{J}\right|}\right), \quad (80)$$

where $S=\sin\theta^{n-1}$, $T=\cos\theta^{n-1}$, where $\theta^{n-1}$ is from previous time-step, then $$j=UT-VS. \quad (81)$$

(3) Using the FVS method in $\lambda$-direction to solve equations (23). The conservation variables are updated from $f_{i,j}^n$ to $f_{i,j}^{n+1/2}$ by the known values $[\rho, u, v, p]_{i,j}^n$ and $U_{i,j}^n$, $V_{i,j}^n$. For the second-order schemes, the MUSCL extrapolation with TVD limiter has to be taken.

(4) Using the Godunov method in $\xi$-direction to solve equation (29). With all $f^{n+1/2}$ and $Q^{n+1/2}$ known at time step n (n=0, 1, 2, . . . ), the Godunov method will be used to update the conservation variables. A complete 2-D local Riemann solver gives the primitive variables $[\rho, u, v, p]_{i,j\pm1/2}$ at the interfaces of the neighboring cells. For the second-order schemes, the MUSCL extrapolation with TVD limiter has to be taken to decide the initial values for the Riemann problem.

(5) Updating the geometry variables. Since the velocities $[u, v]_{i,j\pm1/2}^{n+1/2}$ at the interface of cells are available, then the discretized geometrical conservation equations can be updated to new time step at once by (57), whose accuracy in time and space is decided by the accuracy of the velocities $[u, v]_{i,j\pm1/2}^{n+1/2}$ though the discretized equations are presented in the first-order accuracy.

(6) Finding the physical primitive variable values at the new time step. Decoding from the conservation variables $f_{i,j}=[f_1, f_2, f_3, f_4]_{i,j}^{n+1}$ to obtain the primitive variables $[\rho, p, u, v]_{i,j}^{n+1}$. The primitive variables read as $$\rho = \frac{f_1}{J}, u = \frac{f_2}{f_1}, v = \frac{f_3}{f_1}, p = \frac{\gamma-1}{J}\left(f_4 - \frac{f_2^2 + f_3^2}{2f_1}\right). \quad (82)$$

(7) Grid building. The last step in one time-step is to build the grid if needed. The grid points are given by $$x_{i,j}^{n+1}=x_{i,j}^n+\frac{1}{2}\Delta\tau_{i,j}^n(hu_{i,j}^n+hu_{i,j}^{n+1}); y_{i,j}^{n+1}=y_{i,j}^n+\frac{1}{2}\Delta\tau_{i,j}^n(hv_{i,j}^n+hv_{i,j}^{n+1}) \quad (83)$$

according to which each grid point represents the center of a fluid particle representing by a computational cell. The principle of the time-dependent Lagrangian approach in this invention tells that along $\xi$-direction, the grid lines built here actually are the streamline themselves.

(8) Loop (2). After the numerical procedure for advancing one time-step is complete, to march forward further, one goes back to (2) and repeat (3)-(7), until the conservation variables or primitive variables go to convergence.

Figure 4:
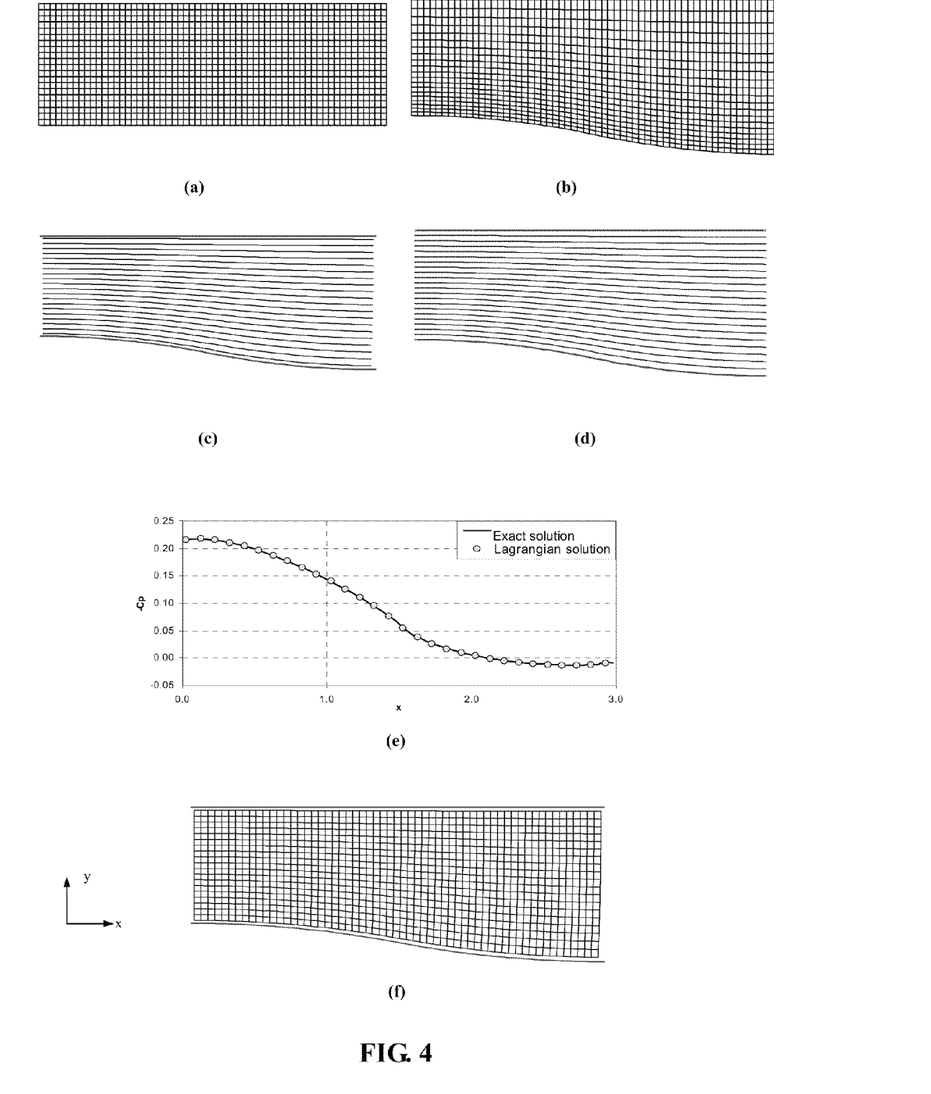
FIG. 4 illustrates the Lagrangian and Eulerian solutions for parabolic nozzle flow at $M_{in}$=0.5
 (a) Grid in Lagrangian plane,
 (b) Grid in Eulerian plane,
 (c) Streamlines by the Lagrangian solution,
 (d) Streamlines by the Eulerian solution,
 (e) Comparison of the pressure distributions by Lagrangian and exact solution on the bottom solid-wall boundary, and
 (f) Grid built by the Lagrangian solution.

The Lagrangian solution starts from the rectangular grid with Lagrangian distance in $\lambda$-direction and stream function in $\xi$-direction in FIG. 4(*a*). The streamlines shown in FIG. 4(*c*) by Lagrangian solution apparently agreed well with Eulerian solution in FIG. 4(*d*), and the pressure distributions on the solid-wall shown in FIG. 4(*e*) totally agreed with the exact solution. The grid used in the Eulerian coordinates in FIG. 4(*b*) has little difference with the grid built by the Lagrangian solution, where the lines along x-direction are streamlines and the lines along y-direction are not perpendicular to x-direction to preserve the length of the streamlines. It is worth to indicate that the final grids in FIG. 4(f) evolve from the initial grid in FIG. 4(a), and it is the result of the Lagrangian solution since the grid lines are the streamlines themselves. Although one does not need this grid in the computing, an evolving procedure can give a clear understanding of the evolution of the Lagrangian solution.

Inverse Geometry Shape Design Case

Figure 5:
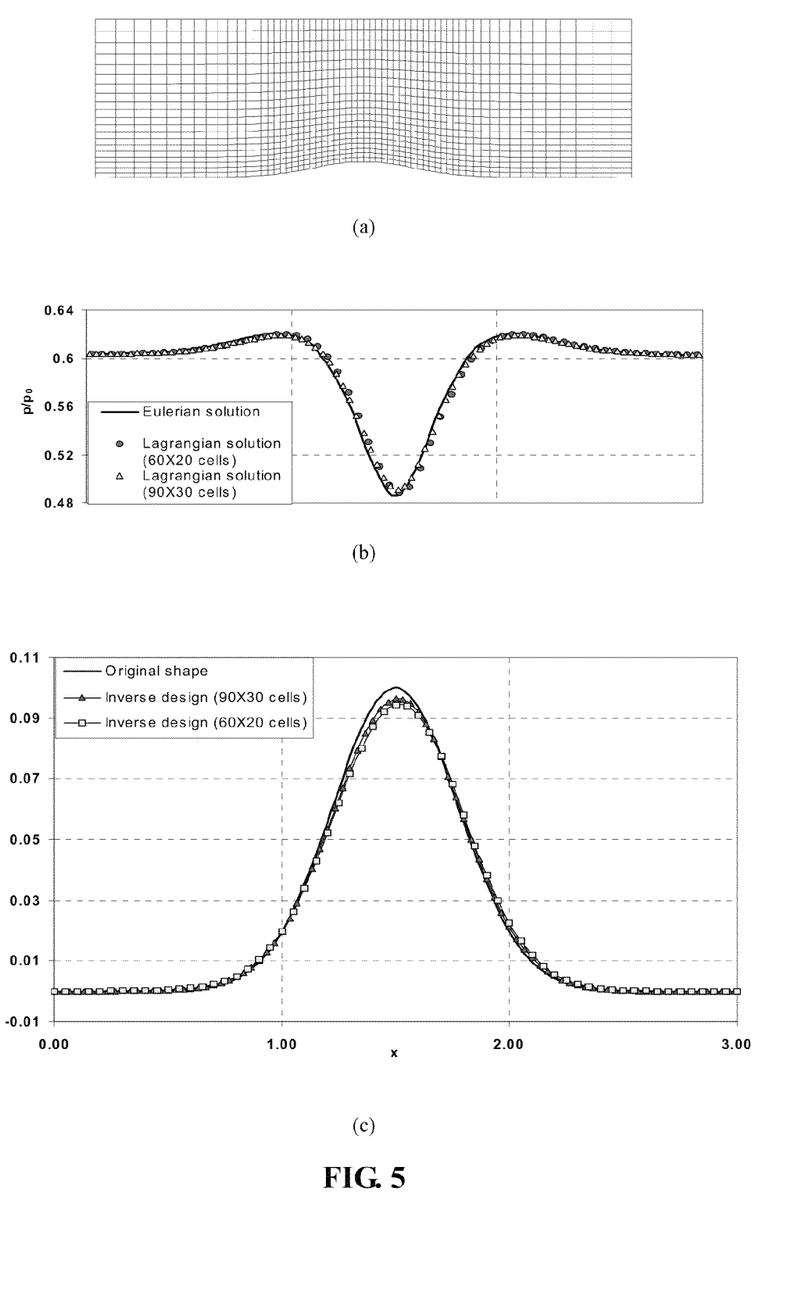
FIG. 5 calculated geometry shape of the solid-wall based on the prescribed pressure distribution
 (a) Grid in Eulerian plane,
 (b) Pressure distribution on the solid wall, and
 (c) Designed solid-wall.

Next case is an example to show the detail how to find the geometry of a solid-wall by solving the two-dimensional Euler equation in Lagrangian formulation. It is an inverse shape design problem. The geometry of the example is a convergent-divergent nozzle. Since the prescribed pressure distribution on the geometrically-unspecified solid-wall need to be input in the inverse problem, one can firstly specify this nozzle's shape and find the pressure distribution, then use this pressure as the input to find the geometry shape by the invented method. The calculated shape should match with the original shape. The profile of the nozzle's solid-wall is given by a function $$y = H_{th} e^{-\beta x^2}, -1 \leq x \leq 1, \quad (84)$$

where $H_{th}$ is taken to 0.1 meaning the 10% bump high of the inlet and $\beta$ is taken 6.5 to control the smoothed convex part which counts about a third of the channel length. For an inlet Mach number of 0.5, it is a pure subsonic flow. The grid generation of this geometry in the Lagrangian plane is identical to that in the previous case shown in FIG. 4(a). The computational grid in Euler plane is given in FIG. 5(a). The Euler equations in Lagrangian formulation (7) and (8) will be solved by the numerical scheme presented in Section 2, where the Strang dimensional-splitting of second-order accuracy in time and hybrid flux operators with second-order upwind MUSCL extrapolation with minmod limiter are used. The computing parameters: CFL=0.48; the Lagrangian behavior parameter h=0.98; and two kinds grid, totally 60×20 and 90×30 uniform cells in Lagrangian plane. To obtain the specified pressure distributions on the solid-wall, the flow field calculations in the Lagrangian and Eulerian plane firstly are implemented like in the previous case. FIG. 5(b) shows the pressure distribution on the solid-wall by the Lagrangian and the Eulerian solution, which will be used as the prescribed pressure distribution in the inverse geometry shape design problem. Also, the adjoint method will be used to solve this inverse design problem to test the computing efficiency of the invented method. The computations are taken as the following steps, in detail:

(1) Initializing the flow field and the solid-wall angle. The initialed flow field variables are set as the same as in the previous case. The solid-wall angle is assumed as $\theta_w=0°$. Since the flow angle on the whole flow field are assumed as zero, the flow angle in the ghost cells is zero $\theta_w=0°$.

(2) Imputing the prescribed pressure distribution on the solid-wall $p_w$.

(3) Solving the inversed Riemann problem across the streamline on the solid-wall boundary based on $p_w$, according to the equations (70)-(77) in Section 2.

(4) Calculating the solid-wall angle. The solid-wall angle can be calculate based on the mirror state condition, then we have $$\theta_w = \frac{1}{2}(\theta_L + \theta_R). \quad (85)$$

$$\theta_w = \frac{1}{2}(\theta_L + \theta_R). \quad (85)$$

(5) Checking the convergence of the solid-wall angle. The variations of the solid-wall angle is the difference of $\theta_w$ between the time step n+1 and n $$\delta\theta_w = (\theta_w^{n+1} - \theta_w^n) \quad (86)$$

If $\delta\theta_w$ is smaller than the convergent tolerance, then the flow field and solid-wall angle come to the final solution $\theta_w^{n+1}$. Otherwise, continue the next steps.

(6) Updating the flow field. The task of this step is to calculate the flow field physical parameters from $[Q]_{i,j}^n$ to $[Q]_{i,j}^{n+1}$ based the updated solid-wall angle $\theta_w^{n+1}$. This step includes the step (1)-(7) introduced in the previous case. After this step, the new flow field parameters ($\rho_R$, $p_R$, $V_R$, $\theta_R$) are obtained.

(7) Repeating (2).

FIG. 5(c) shows the graphic comparison of the computed and original solid-wall shapes. From the results, we can numerically evaluate the precision of the resolution. The computed geometrical shape was found in good agreement with the original shape used as the input; the maximum error is limited within 0.5%. The totally CPU time is only tenth of that by the adjoint method.

While particular embodiments of the invention have been shown and described, it will be obvious to those skilled in the art that changes and modifications may be made without departing from the invention in its broader aspects, and therefore, the aim in the appended claims is to cover all such changes and modifications that fall within the true spirit and scope of the invention.

REFERENCE (1) Godunov, S. K.: A difference scheme for numerical computation discontinuous solution of hydrodynamic equations. Translated US Publ. Res. service, JPRS 7226, 1969.
(2) Van Leer, B.: Flux vector splitting for the 1990's. Invited Lecture for the CFD Symposium on Aero propulsion, Cleveland, Ohio, 1990.
(3) Jameson, A.: Aerodynamic design via control theory. Journal of Scientific Computing, 3:233-260, 1988.15.
(4) Loh, C. Y. and Liu, M. S.: A new Lagrangian method for three-dimensional steady supersonic flows. Journal of Computational Physics, 113, pp. 224-248, 1994.
(5) Mateescu, D.: Analysis of aerodynamic problem with geometrically unspecified boundaries using an enhanced Lagrangian method. Journal of Fluids and Structures, 17, pp. 603-626, 2003.
(6) Stanitz, D. John: A review of certain inverse methods for the design of duct with 2- or 3-dimensional potential flow. Appl. Mech. Rev. Vol. 41, No. 6, June 1988.
(7) Jameson, A., Schmidt, W., Turkel, E.: Numerical solutions of the Euler equations by finite volume methods using Runge-Kutta time-stepping schemes. AIAA-paper, 81-1259, 1981.

The invention claimed is:

1. A computer implemented method for simulating two-dimensional inviscid subsonic flows, comprising the following steps:
(1) Transforming, by using a computer, a set of two-dimensional unsteady Euler equations in a Euler plane into a set of unsteady Euler equations in Lagrangian formulation in a Lagrangian plane, which has one time coordinate direction stated by a Lagrangian time $\tau$ and two space coordinate directions stated by a stream function $\xi$ and a Lagrangian-distance $\lambda$, through a transforming matrix $$J = \begin{bmatrix} 1 & 0 & 0 \\ hu & \cos\theta & U \\ hv & \sin\theta & V \end{bmatrix};$$

said unsteady Euler equations in Lagrangian formulation include two set equations: a set of Lagrangian physical conservation equations and a set of geometric conservation equations, which formally are written as:
the Lagrangian physical conservation equations $$\frac{\partial f_L}{\partial \tau} + \frac{\partial F_L}{\partial \lambda} + \frac{\partial G_L}{\partial \xi} = 0,$$

where $f_L$ is the conservation variables vector and $F_L$, $G_L$ are the convective fluxes respectively in the $\lambda$ and $\xi$ direction in the Lagrangian plane, in detailed $$f_L = \begin{bmatrix} \rho J \\ \rho Ju \\ \rho Jv \\ \rho JE \end{bmatrix}, F_L = \begin{bmatrix} (1-h)\rho K \\ (1-h)\rho Ku + Vp \\ (1-h)\rho Kv - Up \\ (1-h)\rho KH \end{bmatrix},$$

$$G_L = \begin{bmatrix} 0 \\ -p\sin\theta \\ p\cos\theta \\ 0 \end{bmatrix}, \theta = tg^{-1}\left(\frac{v}{u}\right),$$

$K = uV - vU, 0 < h \le 1;$ the geometric conservation equations $$\frac{\partial f_g}{\partial \tau} + \frac{\partial F_g}{\partial \lambda} + \frac{\partial G_g}{\partial \xi} = 0,$$

where $f_g = \begin{bmatrix} U \\ V \end{bmatrix}, F_g = \begin{bmatrix} 0 \\ 0 \end{bmatrix}, G_g = \begin{bmatrix} -hu \\ -hv \end{bmatrix}.$ in all above, the variables t, $\rho$, p, E and H are respectively the time, fluid density, pressure, total energy and enthalpy; u, v are the Cartesian components of flow velocity V, and U, V are the Lagrangian geometry state variables;
(2) reading object geometry for providing points on a surface of an object;
(3) establishing a computing mesh around said object;
(4) using a Strang-dimensional-splitting scheme with hybrid upwind flux operators solving the unsteady Euler equations in Lagrangian formulation in the Lagrangian plane.

2. The method of claim 1, wherein said computing mesh is a two-dimensional rectangular mesh with $\lambda$ and $\xi$ as two coordinate directions in the Lagrangian plane.

3. The method of claim 1, wherein said using the Strang-dimensional-splitting scheme with hybrid upwind flux operators solving the unsteady Euler equations in Lagrangian formulation in the Lagrangian plane comprises the following steps in one time step for updating the conservative variables $f_L$ when the Lagrangian time $\tau$ in the Lagrangian plane evolves,
(1) calculating the convective fluxes across cell interfaces of the computing mesh in $\lambda$-direction by the FVS method with a time-step $\Delta\tau$;
(2) solving a Riemann problem across streamlines in $\xi$-direction with half time-step $\Delta\tau$ by the Godunov method with a local Riemann solver sequentially;
(3) calculating the convective fluxes across the cell interfaces in $\lambda$-direction by the FVS method with the time-step $\Delta\tau$ again.

4. The method of claim 3, wherein said Riemann problem across streamlines in $\xi$-direction comprises that at a left or right state (region) of the cell interface, are shock and expansion waves respectively, between which it is a star state (region), which is divided into a left and a right star states (region) again.

5. The method of claim 3, wherein said solving the Riemann problem across streamlines comprises the following steps:
(1) Connecting a left and a right states to the star state by integrating along a set of characteristic equations of the Lagrangian physical conservation equations;
(2) Recovering velocity magnitude in the star state;
(3) Solving a combination function to find a flow angle in the star state;
(4) Finding the velocity components in the star state.

6. The method of claim 5, wherein said step of recovering the velocity magnitude in the star region is done according to a Rankine-Hugoniot relation across the shocks and an Enthalpy constants relation across the expansion waves.

7. The method of claim 5, wherein said combination function $f(u, v)$ is written as $$f(u, v) = \frac{1}{2}\frac{v\sqrt{u^2+v^2}}{u} + \frac{1}{2}u\ln\left(v + \sqrt{u^2+v^2}\right).$$

* * * * *